UNITED STATES PATENT OFFICE.

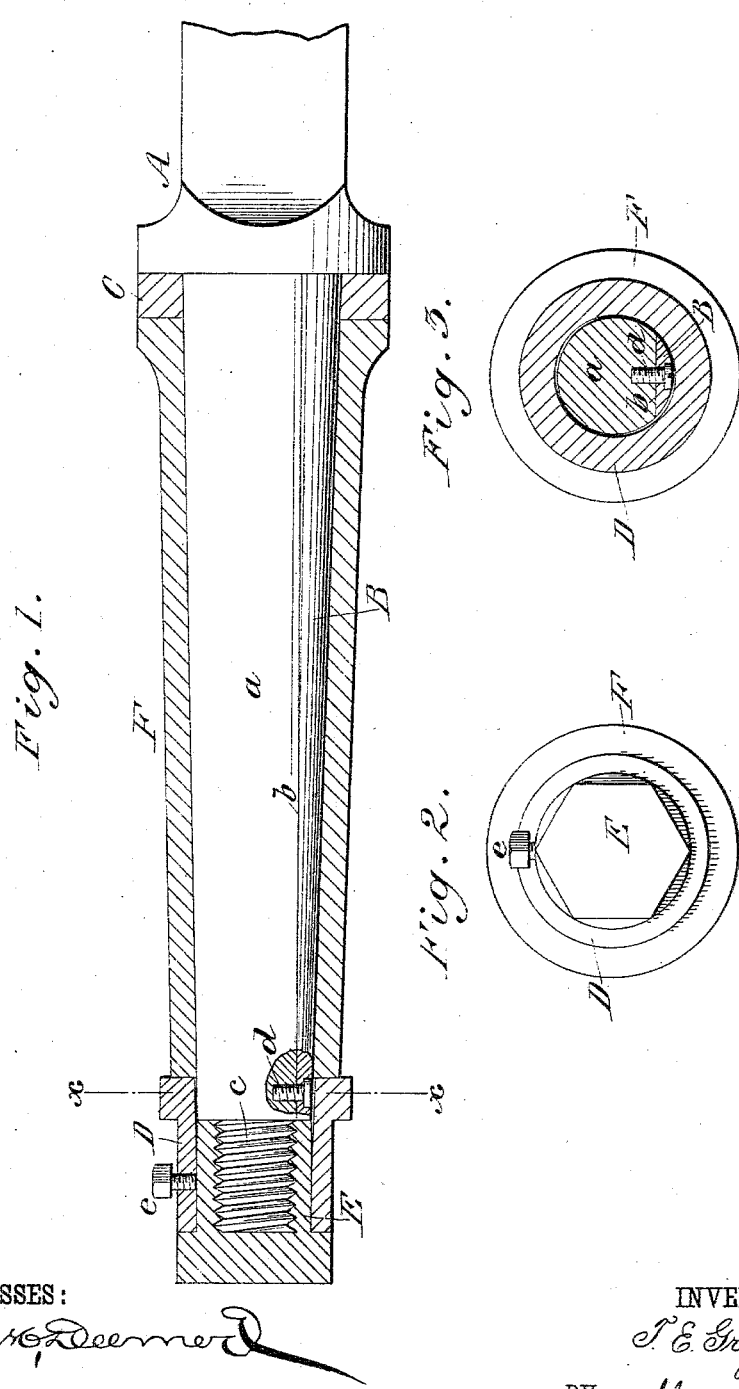

THOMAS E. GREGG, OF MINERAL SPRINGS, SOUTH CAROLINA.

VEHICLE-AXLE.

SPECIFICATION forming part of Letters Patent No. 305,810, dated September 30, 1884.

Application filed June 24, 1884. (No model.)

*To all whom it may concern:*

Be it known that I, THOMAS E. GREGG, of Mineral Springs, in the county of Marion and State of South Carolina, have invented a new and useful Improvement in Axles and Axle Nuts and Collars, of which the following is a full, clear, and exact description.

This invention consists in the construction and combination of parts, as will be hereinafter fully described and claimed.

Reference is to be had to the accompanying drawings, forming a part of this specification, in which similar letters of reference indicate corresponding parts in all the figures.

Figure 1 is a sectional elevation of my invention, an ordinary thimble being shown upon the axle. Fig. 2 is a front elevation of the same, and Fig. 3 is a transverse sectional elevation taken on the line $x\ x$ of Fig. 1.

The journal portion $a$ of the axle A is made flat at $b$, and is also formed at its outer end with the screw-threaded point $c$ in the ordinary manner.

To the flat surface $b$ is applied the wearing-plate B, which is held in place by the washer C, collar D, and the screw $d$, which passes through a countersunk opening made in the wear-plate and enters a screw-threaded opening tapped into the axle, as shown clearly in Figs. 1 and 3.

E is the internally screw-threaded nut which screws upon the point $c$ and fits within the collar D, which is made longer than the screw-threaded point $c$, and is of such internal size that it fits upon the outer end of the journal portion of the axle, so that its inner end or face will come against the outer end of the thimble F, as shown in Fig. 1, for holding the wheel upon the axle, and the collar D is provided with the set-screw $e$, by which the collar may be confined to the nut E at any desired position. The outer end or head of the nut E is made square or with many sides, as shown in Fig. 2, to receive a wrench for removing the nut and collar from and replacing it upon the axle.

In ordinary use the nut E and collar D act together as a single nut, but when the thimble F becomes worn at its ends from running in contact with the collar D and washer C, by loosening the set-screw $e$ the collar D may be shoved forward upon the nut E, and made fast again to take up the wear of the thimble, and when the wearing-plate B becomes worn so as to be too small for the thimble or box of the wheel by removing the washer C, screw $d$, collar D, and nut E, this plate may be removed and a new and larger plate put in its place, so that the wheel may always be made to run true in all directions upon the axle.

Having thus described my invention, I claim as new and desire to secure by Letters Patent—

1. The combination, with the axle $a$ and its wearing-plate $b$, of the collar C, securing said plate at the inner end of the axle, the set-screw $d$ at the opposite end of the axle passing through the wearing-plate into the axle and flush with the face of said wearing-plate, and a collar, D, removably held on the axle and covering the head of the set-screw, substantially as set forth.

2. The combination, with the axle $a$, screw-threaded at $c$, and provided with the wearing-plate held thereon by collar C, and countersunk screw $d$, of the thimble F, collar D, on the outer end of the axle part $a$, covering the set-screw $d$, and resting against thimble F, set-screw $e$, passing through said collar D, and the internally threaded nut E, fitting on the screw-threads $c$ of the axle and within the collar D, as shown.

THOMAS E. GREGG.

Witnesses:
  H. L. WILSON,
  C. W. WILSON.